FIG_7

FIG_5

FIG_6

FIG_8

INVENTOR
DAVID F. GLENDY
BY Hans G. Hoffmeister
ATTORNEY

_United States Patent Office_ 3,241,652
Patented Mar. 22, 1966

3,241,652
ARTICLE HANDLING APPARATUS
David F. Glendy, R.R. 2, Box 18, Mooresville, Ind.
Filed Mar. 2, 1964, Ser. No. 348,607
14 Claims. (Cl. 198—33)

This invention pertains to article handling apparatus and more particularly to means for selectively reorienting cases in a pallet loading machine during the loading of two or more layers onto a pallet.

Where two or more layers of cases are to be loaded onto a pallet, it has been found that instability results if the cases are stacked in vertical columns wherein one case is directly over another. A conventional way to avoid this is to provide for the overlap of one case with respect to cases below by insuring that the pattern of cases in one layer on a pallet is different from the pattern of the layer immediately below it, thus forming a locked load. If this precaution is not observed, a vertical plane of cleavage may occur between the cases of two or more layers with resulting instability. To achieve a locked load, a typical pallet loading machine is programmed to accumulate each layer of cases according to a predetermined pattern and then to accumulate the following layer in a different pattern. For this method of layer forming, rectangular cases are the most adaptable. A pattern is formed by orienting cases as they enter the loading machine in serial fashion from a feed conveyor. The first step is to accumulate a row of cases by holding one case at an intermediate station within the machine until it has been joined by a predetermined number of additional cases, which are all oriented the same way. To accumulate a layer, the row that has been accumulated is then transferred as a unit to a second intermediate station where later it will be joined by a second row formed also at the first intermediate station after the departure of the first row therefrom. If desired, the second row can be programmed to have a pattern different from the first. Several patterns may be obtained even within the same layer if required for proper locking. The first two rows may be joined at the second intermediate station by as many companion rows as are programmed. When the layer is complete, the machine then deposits it, without disturbing the pattern, onto a pallet positioned below. Subsequent layers are formed in patterns provided for by the machine's programming mechanism.

It is an object of the present invention to provide an improved article handling apparatus.

Another object is to provide an efficient mechanism for turning articles about a vertical axis as they are conveyed along a predetermined path.

Another object is to provide a relatively simple mechanism for selectively reorienting cases and similar articles moving on a conveyor.

Another object is to provide an efficient control circuit for an article turning mechanism.

These and other objects and advantages of the present invention will become apparent from the following description taken in connection with the accompanying drawings, in which.

Figure 1:
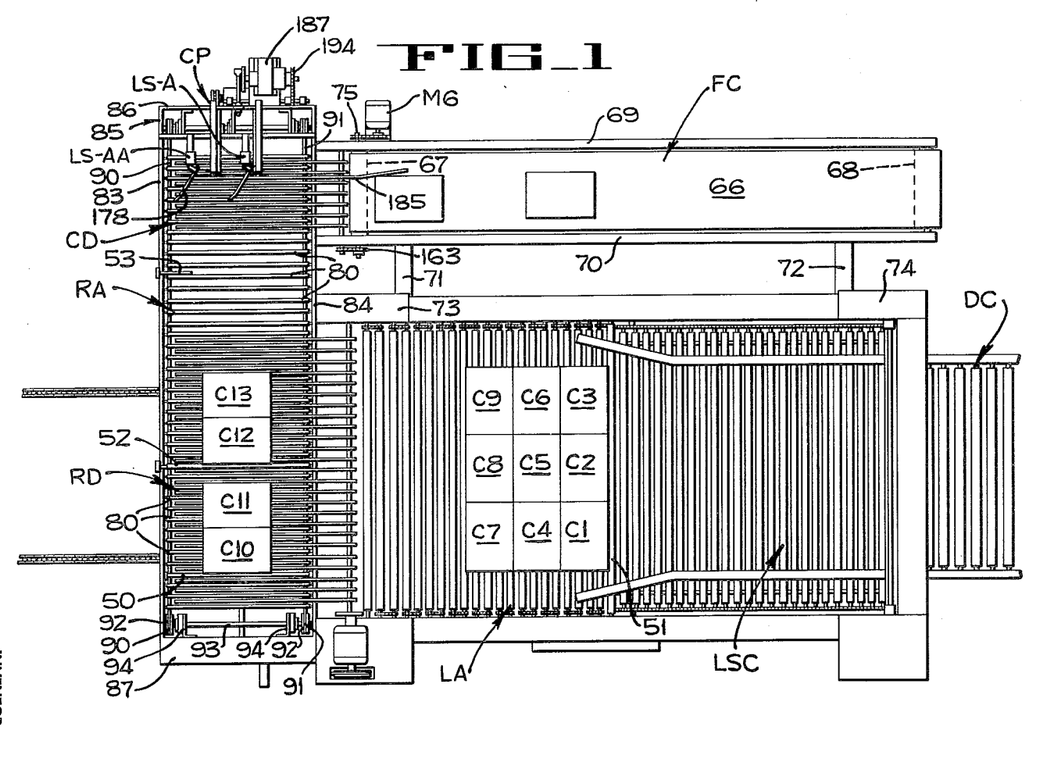
FIGURE 1 is a diagrammatic plan of a pallet loading machine in which the article turning mechanism of the present invention is utilized.

The embodiment of the article handling machine of the present invention that is illustrated in FIG. 1 comprises a feed conveyor FC mounted in elevated position and arranged to deliver articles, such as cases, one-by-one to a case diverter conveyor CD which moves each article laterally onto a row-accumulator conveyor RA. As mentioned previously, in order to form a stable layer of cases, certain of the cases must be turned as they move along the conveyor RA to an orientation at right angles to the orientation they had on the feed conveyor FC. In FIG. 1 it will be seen that cases C1–C9 have been turned 90 degrees while cases C10–C13 have their original orientation. The cases are assembled in a row on a row accumulator conveyor RA, the leading case being in abutting contact with a rotatable stop roller 50, mounted at a fixed position on the conveyor. When a row of cases has been assembled, it is raised off the row accumulator RA and conveyed onto a layer accumulator conveyor LA by an endless belt-type row diverter conveyor RD which has elevatable conveying belts disposed between the rollers of the row accumulator RA. A layer of cases, made up of several rows, is assembled on conveyor LA, the leading row abutting a retractable stop roller 51. When a layer has been formed, the roller 51 is retracted permitting the layer of cases to move onto a layer stripper carriage LSC which is in the form of a flexible chain made up of elongate rollers and arranged to move from the generally horizontal, layer-receiving position shown in FIG. 1 to a generally vertical retracted position. As the carriage moves toward the retracted position, the layer of cases is dropped onto a pallet that is resting on a load elevator which is, at that time, immediately below the portion of the machine occupied by the stripper carriage LSC in FIG. 1.

After each layer of cases is formed in the machine and deposited on the pallet or on a layer of cases that was previously placed on the pallet, the load elevator is lowered a distance equal to the height of the layer so that another layer can be positioned thereon. When a load consisting of the desired number of layers of cases has been formed on the pallet, the load elevator is lowered to a position in alignment with a discharge conveyor DC which carries the loaded pallet out of the machine.

To form gaps between certain cases as they move along the row accumulator conveyor RA, as for example cases C11 and C12, a spacing mechanism in the form of an elevatable roller 52 is provided on conveyor RA.

The machine of FIG. 1 is substantially identical to the machine disclosed in the pending application of Ernest A. Verrinder, Ser. No. 247,081 which was filed on December 26, 1962 and is assigned to the assignee of the present application. The difference between the present machine and that disclosed in the Verrinder application resides principally in the article turning mechanisms used in the two machines. In the machine of the present application the articles are turned by a mechanism which will be described in detail presently and comprises, in general, two switches LS–A and LS–AA (FIG. 1), the case diverter convevyor CD, the row accumulator conveyor RA, and a fixed article-turning bar 53. In the Verrinder machine, the article turning mechanism includes a single switch and a special roller conveyor section disposed between the case diverter CD and the row accumulator conveyor RA. Thus, many of the mechanisms of the present machine are fully disclosed in said Verrinder application and reference may be had to said application for a complete disclosure of any mechanism of the present machine that is not described in detail herein.

Figure 2:
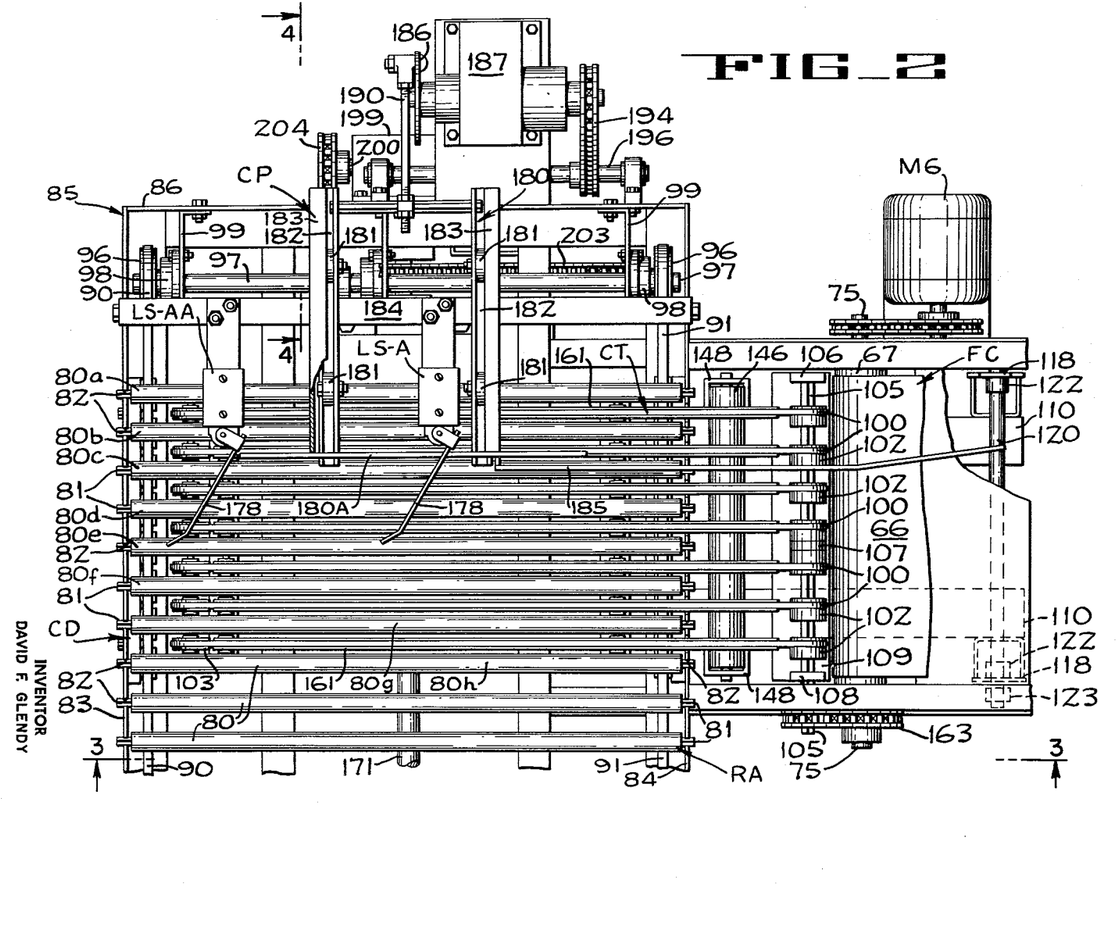
FIGURE 2 is an enlarged diagrammatic plan of a portion of the machine of FIG. 1, particularly showing the article turning mechanism of the present invention.

The feed conveyor FC is an endless belt conveyor and includes a belt 66 that is trained around a drive roller 67 and an idler roller 68, both rollers being supported in spaced side members 69 and 70 that are mounted on fixed support members 71 and 72 projecting from vertical posts 73 and 74 respectively. The drive roller 67 is keyed to a shaft 75 which may be driven in any suitable manner, as by a motor M6 (FIG. 2). It will be understood that this feed conveyor may be part of a preceding case-processing machine and may be driven by the drive mechanism of that machine and of course, it may be supported by separate support structure. The belt 66 is made of a material, such as a rubber composition, suitable for supporting and advancing the particular type of case being palletized.

The row accumulator conveyor RA and the case diverter conveyor CD are shown as a single unit which comprises a plurality of parallel identical rollers 80 (FIGS. 1 and 2), each roller being a hollow member that has a bearing unit pressed in each end. A shaft 81 extends through the tube and through the bearing units and has end portions of hexagonal cross-section projecting from the tube to be received between upright spaced walls defining a groove 82 in the opposite side walls 83 and 84 of a box-like frame 85 that has spaced end walls 86 and 87 (FIG. 1). This frame is supported from the support structure of the machine by suitable upright members.

The first eight rollers 80a–80h form the case diverter CD while the remaining rollers 80 form a row accumulator conveyor RA. It will be evident that the rollers of the case diverter provide a conveying surface which, when energized, will convey any cases supported thereon in a direction at right angles to the direction in which they enter the machine on feed conveyor FC and will transfer them to the accumulator conveyor RA.

The rollers 80 are rotated by the upper runs of two rubber belts 90 and 91 (FIGS. 1–3), which contact the underside of each roller in frictional driving engagement. At one end, each belt is trained around a drive pulley 92 (FIG. 1) that is keyed to a shaft 93 which is rotatably mounted in brackets 94 mounted on the end wall 87 of frame 85. At its opposite end (FIG. 2), each belt is trained around a pulley 96 that is keyed to a shaft 97 which is rotatably journalled in bearing units 98 carried by two brackets 99 that project inwardly from the wall 86 of the frame 85.

Figures 3, 4:
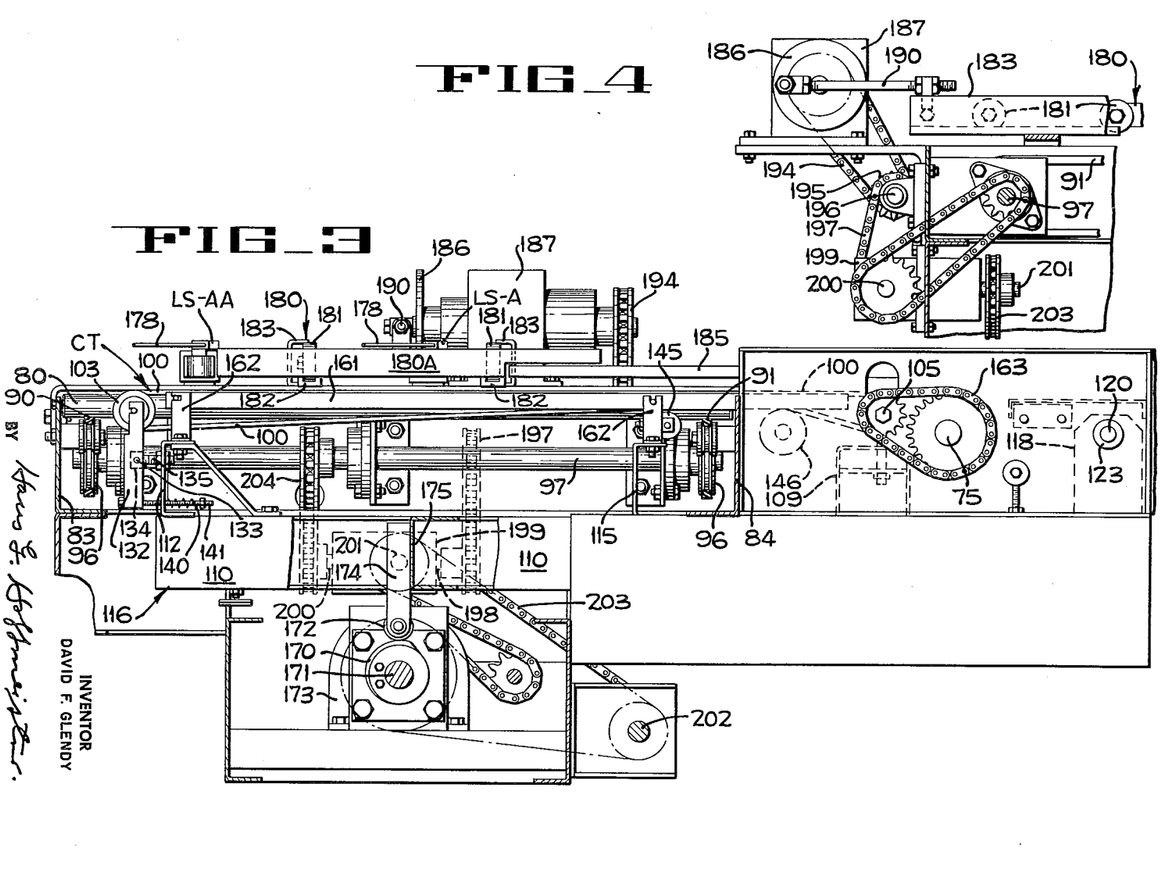
FIGURE 3 is a fragmentary vertical section taken along line 3—3 of FIG. 2.
FIGURE 4 is a fragmentary diagrammatic vertical section taken along line 4—4 of FIG. 2.

The cases are moved from the feed conveyor belt 66 to a position above the rollers 80 by means of a case transfer mechanism CT which includes a plurality of relatively thin V-belts 100 (FIGS. 2 and 3). Each belt is disposed between two adjacent rollers of the diverter CD and, at one end, is trained around a grooved drive pulley 102 and at the other end around a grooved idler pulley 103. Each drive pulley 102 is keyed to a hexagonal shaft 105 which is supported for rotation in three spaced bearings 106, 107 and 108 (FIG. 2) which are mounted on and project upwardly from an inverted channel 109 that extends across the discharge end of feed belt 66 adjacent to and at a lower elevation than the drive shaft 75. At each end, the channel 109 is welded to the upper surfaces of two spaced channel beams 110 which are parallel to the belts 100 and are also secured together by an end channel 112 and by a central channel 115. It will therefore be noted that the two spaced channel beams 110 and the interconnected transverse channel members 109, 112 and 115 make up a rigid pivot frame 116 and, as seen in FIGS. 2 and 3, this frame includes two upstanding plates 118 which are pivotally mounted near their upper ends on a transverse shaft 120. At each of its ends, the shaft 120 extends through a boss 122 welded to the plate 118 and a similar boss 123 welded to the adjacent structural member 70 or 69.

The idler pulley 103 at the downstream end of each of the V-belts 100 is rotatably mounted in opposed walls at the upper end of a bracket 132 (FIG. 3). The bracket is pivotally mounted at 133 in a block 134 which is carried by one end of a bolt 135 that is locked by nuts in the channel 112. Each bracket is urged in a counterclockwise direction (FIG. 3) around pivot point 133 by a spring 140 which is disposed between a nut on a bolt 141 and the channel 112. The bolt 141 passes through openings in the channel 112 and in the bracket 132. Thus, the spring 140 acts as a belt tightener, causing the upper run of the associated belt to be taut and causing the lower run to engage a guide roller 145 that is rotatably mounted on the central channel 115. The lower runs of the belts 100 also ride over the surface of a transverse roller 146 which is rotatably mounted in upstanding arms 148 (FIG. 2) formed by angle brackets whose lower ends are welded to the longitudinal beams 110. Further, the upper run of each belt travels in a guide trough 161 (FIG. 3) which has a generally H-shaped cross-section and is supported by brackets 162 projecting upwardly from the channel 112 and from the central channel 115.

The V-belt drive shaft 105 is driven from the feed conveyor drive shaft 75 by means of a sprocket and chain drive 163 (FIG. 3).

The frame 116 on which the V-belts are mounted is raised and lowered under the control of a cam 170 (FIG. 3) that is keyed to a camshaft 171 and is in contact with a roller follower 172. The follower 172 is rotatably carried on the lower end of a rigid post 174 which is secured to and projects downwardly from a cross beam 175 of the frame 116. As will be explained presently, the camshaft 171 is rotated one complete revolution, by means of a one-revolution electrically operated clutch 173 (FIG. 3), each time a case moves over the belts 100. The clutch may be a Hilliard intermittent drive unit with a positive stop. When the camshaft 171 is stationary, the frame 116 is held in a raised position wherein the upper runs of the V-belts are at a level above the level of the upper surfaces of the rollers 80. Accordingly, each case leaving the discharge end of the feed conveyor belt 66 passes onto the elevated belts and moves to a position above the rollers 80. As it moves toward the wall 83 (FIG. 5) the case engages one or both of the actuators 178 of switches LS–A and LS–AA causing a control operation which results in one revolution of the camshaft 171. As the camshaft rotates, the frame 116 is permitted to lower until the upper runs of the V-belts are below the surfaces of the rollers 80 and the case is resting on these rollers. At this time the rollers 80 are being rotated in a direction to move the case away from the end wall 86 (FIG. 2) of the frame and onto the row accumulator RA.

When cases are advanced on the V-belts 100 at a rate of about 50 cases per minute, the rollers 80 will effectively divert the cases when the cases are deposited thereon. At higher speeds, the cases tend to overtravel as they are deposited on the rollers. To arrest the movement of these high speed cases, a case pusher CP (FIG. 2) is provided which includes a rectangular pusher frame 180 which has four rollers 181 riding in tracks provided by two spaced upwardly-opening channels 182. One leg of an angle bar 183 overlies each channel to prevent upward movement of the rollers in the channel, and each angle bar and each channel is secured to a rigid support bar 184 that extends between the walls 83 and 84 of the frame 85. Cases are guided to a position in front of a pusher plate 180A formed by the front of the pusher frame 180 by a guide bar 185 which extends to a point above the discharge end of feed conveyor belt 66. The frame 180 is reciprocated back and forth by means of a crank disk 186 (FIG. 4) which is keyed to the output shaft of a gear box 187 and pivotally mounts one end of a push rod 190 that is secured, at its other end, to the rear member of pusher frame 180.

The input shaft of the gear box 187 is driven by a chain 194 that is trained over a sprocket 195 keyed to a jack shaft 196 which, in turn, is driven by chain 197 (FIGS. 3 and 4) from one take-off shaft 198 of a gear box 199. The gear box 199 has a second power take-off shaft 200, and an input shaft 201 (FIG. 4) which is driven through a chain and sprocket drive 203 by a shaft 202 (FIG. 3) which is driven by a motor (not shown) of the palletizing machine and extends longitudinally of and is disposed below the frame 85. The chain and sprocket drive 203 also drives the drive element of the one-revolution clutch 173 which, when engaged, rotates the camshaft 171 through one complete revolution.

The second take-off shaft 200 of gear box 199 is connected by a chain 204 to the drive shaft 97 (FIG. 3) which drives the belts 90 and 91 that underlie and frictionally drive the rollers 80 of the case diverter and row accumulator conveyors.

The abutment 53, which is effective to turn articles about a vertical axis, is a rigid bar that is secured to the side wall 83 of frame 85 and projects outwardly over the accumulator conveyor RA. The bar 53 is generally parallel to the rollers 80 and is spaced above the rollers a distance such that the lower portion of the forward face of a case advancing on the accumulator conveyor will engage the bar, if the case is close to the side wall 83, and will be turned substantially 90° about a vertical axis as indicated diagrammatically in FIG. 6. The bar may have an article contacting face made of yieldable material, such as rubber, secured to the bar or formed integral therewith so that an article is not damaged when it engages the bar.

Figures 5, 6, 7, 8:
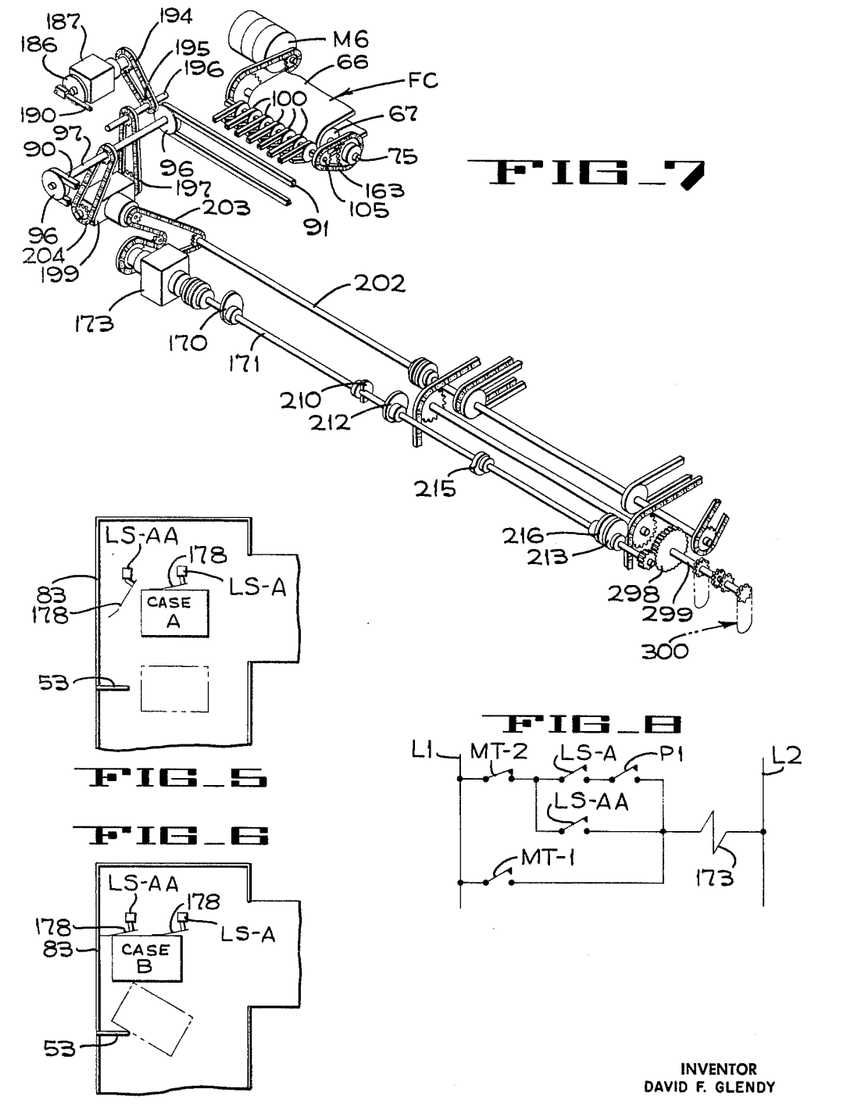
FIGURES 5 and 6 are diagrammatic plans showing the manner in which the article turning mechanism of the present invention operates.
FIGURE 7 is a diagrammatic perspective of a portion of the drive mechanism of the machine of FIG. 1.
FIGURE 8 is a diagram of a portion of the control circuit of the machine of FIG. 1, particularly showing the portion of the circuit associated with the article turning mechanism.

If cases, such as the cases C10–C14 are spaced from the side wall 83 a distance that is greater than the length of bar 53, they will not be intercepted by the bar and accordingly will not be turned, see Case A in FIG. 5.

As previously mentioned, patterns of cases are formed by the coordinated actuation of the case transfer mechanism CT, the case diverter CD, the case spacer 52, the row diverter belts RD and the case stop roller 51. The controls for these units are described in detail in the above-mentioned Verrinder application. Since these mechanisms and their control are not necessary for the operation of the present article turning mechanism itself but only to coordinate the operation of this mechanism in a layer-forming machine, a detailed description of these mechanisms and their control will not be given herein. It will be understood that said application is included by reference in the present specification and reference may be had to said application for a detailed description of structural features and operational features not specifically described herein.

In general, the several above-mentioned mechanisms are controlled by the camshaft 171 (FIG. 7) which drives the electrically-operated one-revolution clutch 173. The cam 170 controls the lowering and raising of the case transfer belts 100; a timing cam 210 actuates switches in control circuit that will be explained presently; a pair of identical cams 212 and 213 control the raising and lowering of the belts of the row diverter conveyor RD; a cam 215 controls the raising and lowering of the case spacer roller 52; and a cam 216 controls the stop bar 51 that releases a layer of cases from the layer accumulator conveyor LA. The only difference between this camshaft 171 and that disclosed in said Verrinder application is that a cam which actuated the specific article turning mechanism of the Verrinder machine has been eliminated in the present machine.

The cams 212, 213, 215, 216 are associated with solenoids in a control circuit and each solenoid is controlled by a switch. The switches are actuated by trip members of a program chain 300, which is indicated in phantom lines in FIG. 7 and is driven from the camshaft 171 by a gear drive 298 and a shaft 299. The chain is an endless member comprising a plurality of connector links 301 (FIG. 10) each of which has a yoke portion defined by arms 302 and 303, and a third arm 304 that extends away from arms 302 and 303. The third arm 304 of one link is disposed between the arms 302 and 303 of an adjacent link, and aligned holes in all three arms receive a mounting or case control rod 305 which has two portions 305A and 305B projecting equal distances on opposite sides of the links 301. Twelve rollers R1–R12 are mounted on each rod, and accordingly, the rollers define columns on the chain, i.e. all rollers R1 define a first column and rollers R2 define a second column. O-rings 306 of rubber or suitable synthetic material lock the twelve rollers on the rod. Rollers R1, R6, R7, and R12 are identical cylindrical rollers and are adapted to fit between adjacent teeth of four sprockets 307 that are secured to the program chain shaft 299, so that rotation of the shaft 299 will cause the chain to be moved relative to eight switches P1–P8 that are secured to a mounting member 308 (FIG. 9) in alignment with the columns defined by rollers R2–R5 and R8–R11 respectively. The mounting member has a hooked end portion 309 disposed around a rod 310 that is carried in a support structure 311 secured to a side plate of the machine. A clamping bar (not shown) is anchored in the structure 311 and overlies the mounting member 308. When the program chain is to be replaced, the clamping bar is swung aside, the member 308 pivoted upwardly, and the chain lifted off the sprockets. The gear mechanism that drives shaft 299 is such that for each revolution of camshaft 171, the chain is moved relative to the switches a distance equal to the distance between adjacent rods of the chain.

Figures 9, 10:
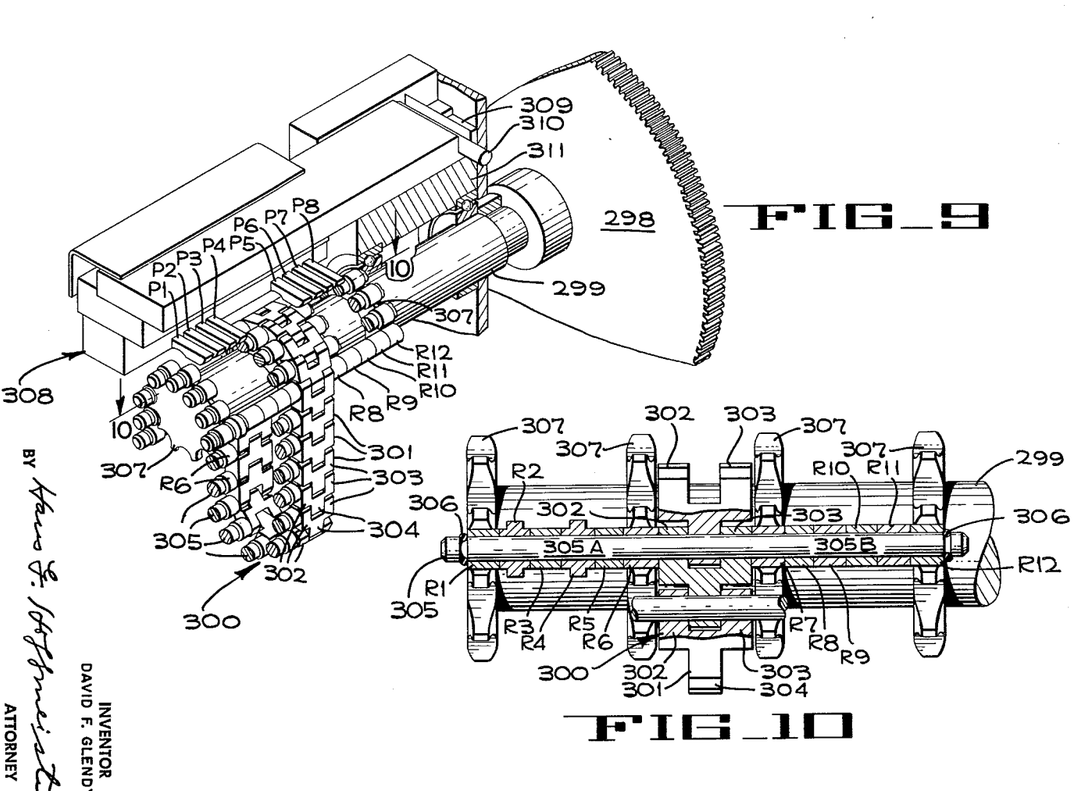
FIGURE 9 is a fragmentary diagrammatic perspective of a program chain used in the machine of FIG. 1.
FIGURE 10 is a generally horizontal section taken along line 10—10 of FIG. 9.

The switches, which are shown only diagrammatically in FIG. 9, may be sub-miniature switches of the type known as Licon 16–404. The mounting for the switches and the program chain are disclosed in detail in the application of Ernest A. Verrinder and Francis Curtis, Ser. No. 247,142 filed on December 26, 1962 and assigned to the assignee of the present application. Reference may be had to said application for details of construction and operation that are not specifically mentioned herein.

In FIG. 10, a rod is shown having rollers R3, R5 and R8–R11 that are identical to roller R1, while rollers R2 and R4 are of enlarged diameter. The size of the rollers is so chosen that only the large rollers R2 and R4 will actuate the associated switches when they are moved to a position thereunder. In a typical layer forming sequence involving the operations of case turning, case spacing, row diverting, and layer releasing, only four solenoids are to be actuated and these solenoids are associated with switches P1–P4. Accordingly, there is no need for actuating switches P5–P8 and therefore all rollers R8–R11 on all mounting rod portions 305B will be small diameter rollers that cannot actuate switches. It will be understood however that any of the rollers R2–R5 and R8–R11 may be large diameter rollers if desired.

The number of control rods 305 on a program chain depends on the number of cases in the layer of cases to be formed. For example, if a two layer load is to be formed and each layer has thirteen cases, as in FIG. 1, there can be 26 control rods 305 on the chain, each rod being associated with one case entering the machine. If a control operaiton, such as the diverting of a previously formed row, must take place while a particular case enters the machine, a large roller is placed on the control rod associated with that case, said large roller being located in the column associated with the switch P1-P4 that is to be closed.

The present invention particularly concerns the case-turning operation and, in general, it is to be noted that whenever a case is to be turned a small roller R2 is placed on the control rod for that case. If the case is not to be turned, a large roller R2 is placed on the control rod.

A sequence in the handling of two cases by the case turning mechanism of the present invention will be described in connection with the operational diagrams of FIGS. 5 and 6 and the partial control circuit of FIG. 8. In the diagram of FIG. 8, switch LS-A is shown in a circuit between lines L1 and L2 that are connected to a source of 115 v. 60 cycle electric power. This circuit includes a timing switch MT-2, the switches P1 and LS-A, and the single revolution clutch 173. The switch LS-AA is in a separate circuit including the timing switch MT-2 and the clutch 173. A second timing switch MT-1 is in a circuit with the clutch 173.

When the camshaft 171 has rotated 360° incident to an energization of the single revolution clutch, the cam 210 on camshaft 171 closes switch MT-2. Also, at the end of each rotation of the camshaft 171, one of the control rods 305 of the program chain is moved into position under the switches P1-P4 and if there are any large rollers on that control rod, the associated switches will be closed.

Referring to FIG. 5, Case A is not to be turned. Accordingly, a large roller R2 is placed on the control rod associated with Case A and the switch P1 is thereby closed when the camshaft comes to rest after a previous operation. Case A then enters the machine, engages and closes switch LS-A to energize the clutch 173 and rotate camshaft 171. As a result, the cam 170 on camshaft 171 lowers the case transfers belts onto the row diverter rollers, causing the case to be immediately carried laterally along the path indicated in FIG. 5 so that it will not engage the turn bar 53 and will continue in its original orientation.

Case B (FIG. 6) is a case that is to be turned. Accordingly, the R2 roller on the program chain control rod associated with Case B is a small roller that will not close switch P-1 when moved to a position adjacent P-1. Then, when Case B engages and closes switch LS-A, the clutch 173 will not be energized since P-1 is open. As Case B continues forwardly, it engages and closes switch LS-AA. Now the clutch is energized to rotate the camshaft 171 and cause the belts of the transfer mechanism CT to lower the case onto the rollers of the case diverter. Case B is immediately carried laterally by the rollers along the path indicated in FIG. 6. When Case B engages the turn bar 53, it swings around the bar for 90 degrees about a vertical axis.

It is to be noted that, although the closing of one of the switches LS-A or LS-AA initiates the energization of clutch 173, the clutch is maintained energized for a predetermined time through switch MT-1 which is closed by cam 210 on camshaft 171 shortly after the camshaft starts to rotate.

From the foregoing description it will be apparent that the present invention provides a relatively simple article turning mechanism that can be programmed to selectively turn certain ones of successive articles moving along a conveyor, or to turn predetermined cases as they are being moved through a pallet loading machine. While only a fragment of a pallet loading control circuit is shown, it will be understood that the entire control circuit for a palletizer using the control circuit of FIG. 8 can be arranged by incorporating this circuit in the circuit of said Verrinder application Ser. No. 247,081. Also, it will be evident that the turning mechanism can be used independently of a palletizing machine by providing suitable indepedent drive mechanisms for the power driven shaft 202.

It will also be noted that, while the row accumulator conveyor is a single structure having two "paths," only one of which carries the article against the turn member 53, two separate parallel accumulator conveyors could be used so that two distinct conveying surfaces would be provided, only one of which would be associated with a turn mechanism. Accordingly, in the following claims the terms "paths" and "conveying surface portions" will be used in association with the accumulator conveyor to generically describe a single conveyor having two paths or two conveyors. Also, while an electrically-operated control system is shown, it is within the scope of the present invention to provide other such control systems such as a system having air operated valves engaged by articles to control an air system that effects a one-revolution operation of the camshaft. Accordingly, the terms "power" means, "control" means and "article-sensing" means will be used in the claims to generically cover control systems equivalent to the disclosed electric control system.

It should be noted that while the case transfer mechanism CT is effective to transfer the article from conveyor FC to a position above the diverter conveyor CD, the mechanism is essentially a conveyor and is actually the conveyor that moves the articles into contact with the switches LS-A and LS-AA. Accordingly, it will be evident that the article feeding conveyor mentioned in the following claims is the belt conveyor CT, and the "transfer" means recited in the claims is the control mechanism for lowering the belts so that the articles are transferred to the case diverter CD.

It will be understood that modifications and variations may be made without departing from the scope of the present invention as defined by the claims appended hereto.

Having thus described my invention what I claim as new and desire to protect by Letters Patent is:

1. An article turning mechanism comprising a first conveyor arranged to advance articles along a predetermined path, a second conveyor having two parallel conveying surfaces extending at an angle to said first conveyor, transfer means arranged when actuated to transfer an article on said first conveyor to one of said parallel conveying surfaces, power means for actuating said transfer means, control means for activating said power means, upstream and downstream article-sensing members disposed in the path of movement of an article advancing along said predetermined path and operatively connected to said control means, selective means for preconditioning said control means to cause activation of said power means upon contact of an article with only one of said article-sensing members, actuation of said transfer means incident to activation of said power means by said upstream article-sensing member being effective to transfer an article to one of said parallel conveying surfaces and actuation of said transfer means incident to activation of said power means by said downstream article-sensing member being effective to transfer the article to the other parallel conveying surface, and an abutment extending part way across one of said parallel conveying surfaces to intercept and turn an article advancing thereon.

2. An article orienting mechanism according to claim 1 wherein said power means is an electrically operated camshaft, and said article-sensing members are electric switches.

3. An article orienting mechanism according to claim 1 wherein said transfer means comprises a carriage supporting a portion of said first conveyor for vertical movement from a raised position above the level of said second conveyor to a lowered position below the level of said second conveyor to transfer an article to said second conveyor, and a mechanism for controlling the raising and lowering of said portion.

4. An article orienting mechanism comprising an article delivery conveyor, a takeaway conveyor intersecting said delivery conveyor and extending at right angles thereto and having two parallel conveying surfaces, an article turning mechanism arranged to engage an article moving along one of said surfaces and turn it about a vertical axis, transfer means arranged when actuated to transfer an article on said delivery conveyor to said takeaway conveyor, power means for actuating said transfer means, control means for activating said power means, upstream and downstream article-sensing members disposed adjacent said article delivery conveyor to be actuated by an article advancing on said delivery conveyor, means operatively connecting said article-sensing members in said control means, and means for preconditioning said control means to cause actuation of one of said article-sensing members by an article to actuate said transfer means and deposit the article on the parallel conveying surface having said article turning mechanism associated therewith, and to cause actuation of the other sensing member by an article to actuate said transfer means and deposit the article on the other parallel conveying surface.

5. An article orienting mechanism in accordance with claim 4 wherein said takeaway conveyor comprises a roller conveyor and said article delivery conveyor is a belt conveyor having a plurality of belts disposed between the rollers of said takeaway conveyor.

6. An article orienting mechanism in accordance with claim 4 wherein said article delivery conveyor comprises a portion overlying said takeaway conveyor and said transfer means includes a lowering mechanism arranged to support said overlying delivery conveyor portion and to lower said portion to an elevation below the elevation of said takeaway conveyor to transfer articles to said takeaway conveyor.

7. An article turning mechanism comprising a first conveyor having a conveying surface arranged to advance articles along a predetermined path, a second conveyor having a conveying surface extending at an angle to the conveying surface of said first conveyor, the conveying surface of said second conveyor having a width that is greater than the length of the article to be handled, article transfer means arranged when actuated to transfer an article from said first conveyor to said second conveyor, electric power means, an electric circuit connected to said power means and arranged when operated to actuate said transfer means, a pair of switches associated with said circuit, selective means for preconditioning said circuit so that actuation of one of said switches will close said circuit, means providing two parallel lateral conveying portions on the conveying surface of said second conveyor, the first lateral conveying surface being associated with said upstream switch and located upstream from the second conveying surface portion relative to the direction of movement of articles along said predetermined path, actuators for said switches positioned to be engaged by articles being moved along said predetermined path, the actuator of one of said switches being located upstream from the actuator of the other switch relative to the direction of movement of articles along said path, operation of said circuit by said upstream switch being effective to actuate said transfer means and cause the article to be transferred to said first lateral conveying surface portion and operation of said circuit incident to engagement of the actuator of the downstream switch by an article being effective to actuate said transfer means and cause the article to be transferred to said second lateral conveying surface portion, and an abutment member extending part way across one of said lateral conveying surfaces to intercept an article advancing thereon and turn the article about a vertical axis.

8. An article orienting mechanism according to claim 7 wherein said selective means comprises a program chain having an element selectively positioned thereon and associated with each article of a sequence of articles to be oriented, each element being of a configuration adapted to control the circuit in a manner to cause the desired orientation of the particular article associated with the element.

9. An article turning mechanism comprising a takeaway conveyor having a conveying surface, means defining a selective diverting and turning station at one end of said conveyor, means for diverting an article entering said station from its original path of travel into one of a plurality of new paths of travel defined by a plurality of locations on said conveying surface spaced longitudinally of said original path of travel, a fixed stop member disposed above said conveying surface and partially obstructing the path travelled by an article diverted into one of said new paths, a plurality of electrical switches for initiating the actuation of said diverting means, levers for operating said switches disposed above the moving surface and adapted to be engaged by an article entering said station, and means for disabling at least one of said switches.

10. An article orienting mechanism comprising a conveyor having a plurality of rollers defining a conveying surface having considerable transverse extent, an article diverting means including an array of moving belts generally parallel to and interspersed among said rollers and arranged to be raised to a position higher than or lowered to a position lower than said rollers, means for driving said belts, means for raising and lowering said array of belts to transfer an article from said belts to said rollers, and means for selectively operating said raising and lowering means while an article on said belts is above different transversely spaced areas of said driven roller conveyor whereby articles may be transferred to and carried laterally of said belts along different paths on said roller conveyor, and article turning means associated with said roller conveyor and arranged to turn articles travelling along one of said paths.

11. An article orienting mechanism comprising a roller table, a selective case diverter including a carriage of parallel driven belts lying between said rollers and adapted to be elevated to a position higher than and depressed to a position lower than said rollers, electrically controlled lowering means for moving said carriage from said higher to said lower position to transfer an article from said belts to said rollers, a plurality of electrical switches associated with said lowering means for controlling movement of said carriage, a plurality of levers for operating said switches and adapted to be engaged sequentially by an article carried on said moving belts, selective means for disabling at least one of said electrical switches, said roller table defining two laterally extending conveying paths, actuation of said electrically controlled means incident to engagement of each of said levers by an article being effective to cause the article to be deposited on a separate one of said laterally extending paths, and means extending over one of said paths for intercepting an article and turning it about a vertical axis as it moves along said roller table.

12. In an article handling machine having a table of driven rollers, means for selecting one of a plurality of new paths of travel on said table defined by a plurality of locations transverse to the path of travel of said rollers comprising an array of V-belts parallel to each other and placed in vertically movable relation to said rollers whereby one V-belt lies between and parallel to each two adjacent rollers, a carriage to support the V-belts, to lower them all simultaneously from a higher position above said rollers to a lower position below said rollers and to return them to said upper position, drive means for turning said V-belts to provide a surface moving steadily in a direction at right angles to the direction of movement of the upper surfaces of said rollers, electrical means for moving said carriage from one of said positions to the other of said positions, a plurality of mechanically operated switches for controlling said electrical means, and a plurality of contact levers for actuating said switches disposed above said array in the path of an article moving thereon whereby each lever is contacted in sequence as said article moves with the surface formed by said array and is operatively connected to one of said switches.

13. An article turning mechanism comprising a conveyor arranged to advance articles along a predetermined path, conveying means having two conveying surfaces extending laterally from said conveyor, transfer means arranged when actuated to transfer an article on said conveyor to a selected one of said conveying surfaces, power means for actuating said transfer means, control means for activating said power means, upstream and downstream article-sensing members disposed in the path of movement of an article advancing along said predetermined path and operatively connected to said control means, selective means for preconditioning said control means to cause activation of said power means upon contact of an article with one of said article-sensing members, actuation of said transfer means incident to activation of said power means by said upstream article-sensing member being effective to transfer an article to one of said conveying surfaces and actuation of said transfer means incident to activation of said power means by said downstream article-sensing member being effective to transfer the article to the other conveying surface, and an abutment extending part way across one of said conveying surfaces to intercept and turn an article advancing thereon.

14. An article orienting mechanism comprising an article delivery conveyor, takeaway conveyor means extending at right angles to said delivery conveyor and having two conveying surfaces, an article turning mechanism arranged to engage an article moving along one of said surfaces and turn it about a vertical axis, transfer means arranged when actuated to transfer an article on said delivery conveyor to said takeaway conveyor means, power means for actuating said transfer means, control means for activating said power means, a pair of spaced article-sensing members disposed adjacent said article delivery conveyor to be actuated by an article advancing on said delivery conveyor, means operatively connecting said article-sensing members in said control means, and means for preconditioning said control means to cause actuation of one of said article-sensing members by an article to actuate said transfer means and deposit the article on the conveying surface having said article turning mechanism associated therewith, and to cause actuation of the other sensing member by an article to actuate said transfer means and deposit the article on the other conveying surface.

References Cited by the Examiner
UNITED STATES PATENTS
2,997,187  7/1961  Burt ______________ 198—33.2

SAMUEL F. COLEMAN, *Primary Examiner.*

RICHARD E. AEGERTER, *Examiner.*